March 3, 1959 P. K. GIRTON ET AL 2,875,590
EQUIPMENT AND PROCESS FOR ATTEMPERING, STORING, AND WEIGHING
Filed Oct. 5, 1956 2 Sheets-Sheet 1
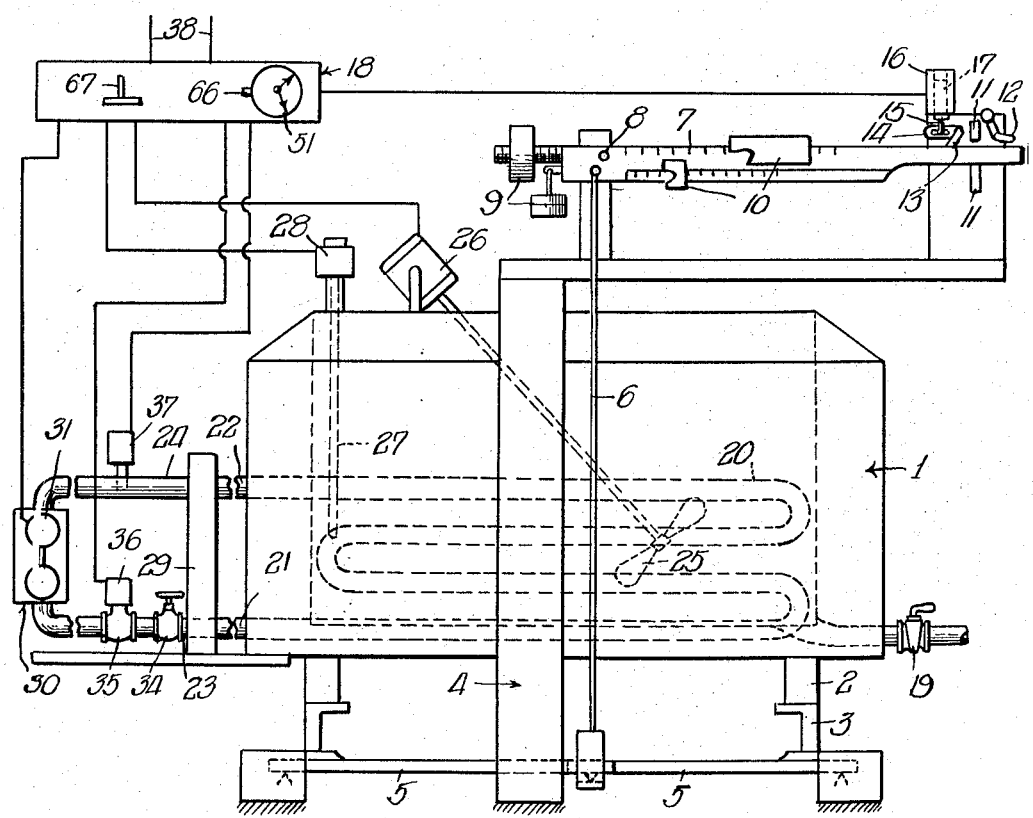
Fig. 1
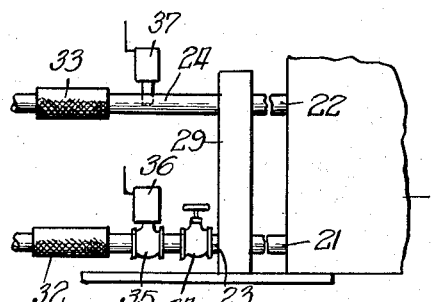
Fig. 2
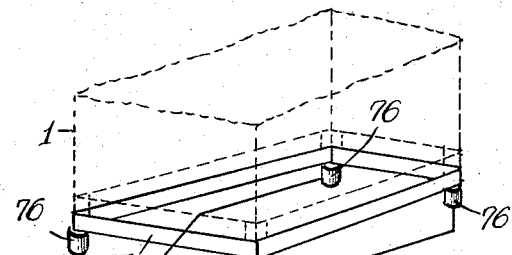
Fig. 3
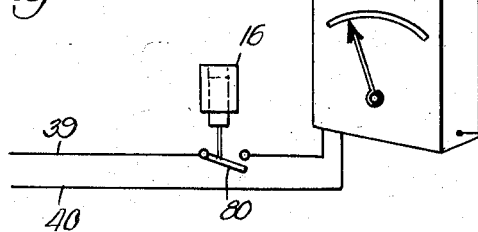
INVENTORS.
Paul K. Girton,
BY Darl L. Evans,
Norman C. H. Heletzke
Atty.

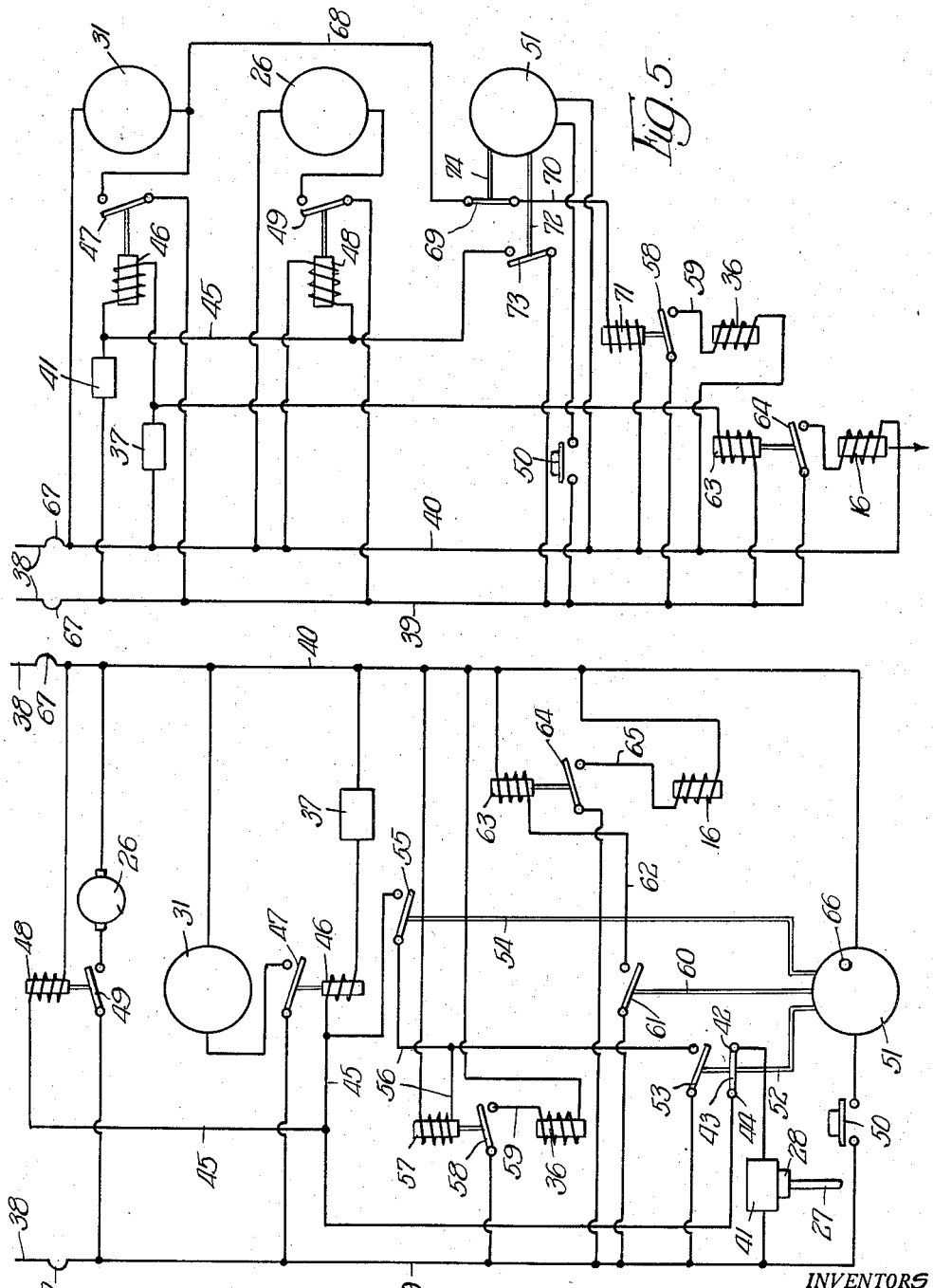

United States Patent Office 2,875,590
Patented Mar. 3, 1959

2,875,590

EQUIPMENT AND PROCESS FOR ATTEMPERING, STORING, AND WEIGHING

Paul K. Girton, Millville, and Darl L. Evans, Bloomsburg, Pa., assignors to Girton Manufacturing Company, Inc., Millville, Pa., a corporation of Pennsylvania Application October 5, 1956, Serial No. 614,268

31 Claims. (Cl. 62—98)

This invention relates to improvements in apparatus and process for the storing, attempering, blending, and weighing of a product. More specifically stated, this invention relates to improvements in the combination of interacting equipment and the process of handling a product with respect to the storing, and attempering, and weighing, as for example, cooling the product and determining the weight of the cooled product. The product may be a liquid such as milk or like fluids or other readily mixable and flowable products.

This invention also relates to the novel structural features and the combining arrangement of the separate structural features and the operating controls embodied in the improved apparatus whereby to enable the effective storing, attempering, blending and accurate weighing of the product without the introduction of errors which may result from the movement of refrigerant from the evaporation section of a cooling system as the cooled or refrigerated product is withdrawn from the storage vat and before the net weight of the product has been determined.

Although the invention may be readily adapted for use in the handling of many products, it was initially developed as a device and process for the storing, cooling, blending, and weighing of milk. The copending application Serial No. 614,269, filed October 5, 1956, pertains to a somewhat similar invention.

In the production of milk, particularly fresh milk, it is common practice for the producer to accumulate the milk in refrigerated type storage vats in which the milk is cooled and stored pending the sale of the milk. When the milk is sold the price is commonly based upon the weight of the milk and the butter fat content of the milk.

The weight of the milk contained in a vat is commonly determined by the use of a depth measuring stick which has been suitably graduated to indicate the weight or the volume of the milk contained in the storage vat for a specific depth of milk in the vat. Obviously, such a procedure of determining the weight of milk in a vat, particularly a large vat, requires that the depth measuring stick be expertly used. Slight mistakes in the use of the depth measuring stick will result in sizeable errors in determining the weight of the milk and may be costly to the seller or the buyer of the milk.

To secure good uniform samples of the refrigerated milk it is also necessary that all of the milk in the vat be uniformly blended as by the use of suitable agitation.

In certain instances to measure the quantity of the milk stored in a vat the milk is passed through a metering device at the time of emptying the vat. Such a manner of determination of quantity, as by the use of a meter, and indirectly the determination of weight may be satisfactory in the handling of certain liquids. But, in the handling of a product, such as milk, which contains appreciable quantities of gas, and which has a tendency to foam, the metering of the product is not fully satisfactory. It has been found that the presence of gas or foam in the product will cause errors in the readings of the meters.

To avoid the problems and difficulties inherent in the use of graduated depth measuring sticks or in the use of meters for determining the net weight of a cooled flowable product such as milk, which may contain gas, it appears that an arrangement for weighing the product is most desirable. It also appears that it would be desirable to weigh the product while stored in the refrigerated vat, so as to avoid any extra handling of the product for the express purpose of weighing the product. However, when such a refrigerated vat includes cooling coils or passages through which a refrigerant is circulated, and such refrigerant is commonly of the volatile type, it then also becomes necessary to provide apparatus and a method whereby automatically to avoid introducing discrepancies in the proposed weighing operation which discrepancies may result from the vibration of the scales caused by the operation of compressors during the weighing operation and may also result from the evaporation or circulation of refrigerant from the cooling coils of the vat during the weighing operation. Such weighing operations obviously contemplate the initial weighing of the vat and its contents and the final weighing of the empty vat, after the cooled product has been removed.

In the handling of perishable products such as milk it is also essential that the storage vat be frequently cleaned.

It is, therefore, an objective of the present invention to provide new, novel and useful improvements in apparatus and process usable in the handling of fluids incidental to the storing, cooling, and weighing of the fluid, wherein the fluid, such as milk or other flowable material, may be accumulated, refrigerated or attempered, blended, sampled, and accurately weighed in a single unit.

A further object of this invention is to provide improved apparatus for attempering, storing and weighing a product in a refrigerated receptacle or vat wherein the refrigerant may be of the circulating volatile type, wherein the possible adverse effects on the weighing operation resulting from the circulation or evaporation of the refrigerant as well as the possible adverse effect of the operation of refrigerant circulating pumps, compressors and driving motors have all been obviated.

A still further objective of this invention is to provide an improved arrangement for attempering, storing, blending and weighing a fluid such as milk and the like, wherein the weighing device is automatically rendered inoperative during periods during which the blending device and the refrigeration portion of the storage device are free to operate.

Another object of the present invention is to provide an improved apparatus for attempering, storing, and weighing a product, wherein the attempering medium, such as volatile refrigerant is withdrawn from the attempering medium passages prior to weighing of the product so that the evaporation of the refrigerant will have no bearing upon the determination of the weight of the product and so that the storage chamber may be safely cleaned after the product has been weighed and removed from the storage chamber.

The foregoing and other objectives, important novel operational and structural features and advantages of this invention, will become more apparent and be more easily understood upon examination of the following description thereof and the accompanying drawings and the appended claims. It should, however, be understood that, without desire of limitation, the invention will be described and illustrated as a preferred embodiment of the invention in a refrigerated storage, agitating and weighing tank or vat for milk and like products. Certain changes and variations may suggest themselves to those skilled in the pertinent arts, which changes may not, however, depart from the spirit of this invention and may come within the scope of the appended claims.

In the accompanying drawings:

Figure 1 is a front elevational view, showing diagrammatically a mechanical scale supporting a refrigerated type vat having a self contained refrigeration unit;

Figure 2 is a fragmentary front elevational view showing a modified arrangement for controllably supplying refrigerant to the refrigerated vat from a separate or central refrigeration unit;

Figure 3 is a perspective view, partially broken away, diagrammatically illustrating an electronic type of scale supporting the refrigerated vat;

Figure 4 is a schematic showing of an electric wiring diagram showing the use of a timing device for the operation of controls to secure the desired sequence of operations for the improved apparatus; and Figure 5 is a schematic showing of a modified form of an electric wiring diagram for the improved apparatus.

Referring to the drawings, in which like elements are identified by like numerals, and describing the invention, without desire of limitation, as an embodiment in a device for storing, refrigerating, blending, and weighing a fluid product such as milk or the like, 1 represents a refrigerated storage chamber or weigh tank or vat of the open top or atmospheric type for confining milk, supported by legs 2 on the support members 3 of a mechanical or lever type scale or weighing device 4. The scale or weight sensitive device 4 may be of a conventional type wherein the weight or downwardly directed thrust of the vat 1 is transmitted, at least in part, from supports 3 through levers 5 and linkage 6 to the balance beam or weight indicator 7. Beam 7 is graduated in conventional manner and comprises the intelligence conveying element of the scale 4, and is suitably pivoted at 8 to a vertical portion of the framework of the scale. Beam 7, in conventional manner is provided with adjustable counter weights 9 and with adjustable poise elements 10.

Stops or restraining or inactivating elements 11 are carried by the framework of scale 4 close to the free end of the intelligence conveying element or beam 7 of scale 4 to limit or restrain the oscillations of the weight indicator or balance beam 7. The framework of the load sensitive or force measuring scale device 4 also carries the conventional manually operable and eccentric type, pivoted, or crank arm balance beam lock or restraining device or inactivator 12 which is positioned adjacent one side of the stop elements 11 and above the free outer end of the beam 7. Lock 12, when adjusted into locking position will securely lock beam 7 against the lower stop element 11 to thereby prevent the oscillation of the beam. Also carried by the framework of scale 4, and positioned on the opposite side of stops 11 from the lock 12 is a second pivoted crank arm type beam lock 13 which is operably connected by suitable linkage 14 to the vertically movable stem 15 of the electromagnetic solenoid type beam lock actuator solenoid 16 which is also carried by the frame of scale 4. The mechanical connection of the linkage 14 to the armature stem 15 is such that the downward gravitational movement of the armature 17 of the solenoid type actuator 16 will normally pivot the beam lock or restraining device 13 into beam locking or restrained position by forcing the beam 7 against the lower stop 11 whenever the solenoid 16 is not energized. Energization of the prime mover or solenoid type actuator 16 will lift the armature 17, thereby, through linkage 14 pivoting lock 13 into beam unlocking position to permit the free oscillation of the beam 7. Electric power is supplied to solenoid 16 through suitable cable from the control box 18 housing the desired electrical controls and switches hereinafter to be described in more detail with respect to the wiring diagrams illustrated in Figures 4 and 5 of the drawings, for the distribution and control of the power secured from power source 38 for the operation of the electrical components of the improved device.

The vat or confining container receptacle 1 may, if desired, be provided with a valved product discharge outlet 19, and is also provided with a passage 20 for the circulation of the attempering medium or refrigerant. The passage 20, which does not communicate directly with the product space in container 1, may be built into the walls and/or bottom of the vat or tank 1 as shown in Figure 1, or, if desired, may be in any of the conventional coil forms housed in the product compartment of the vat 1, or may be in any other of the well-known and conventional arrangements for heat exchange passages.

Passage 20 has an inlet end or connection 21 and an outlet end or connection 22, connected respectively to the refrigerant supply conduit 23 and the refrigerant discharge conduit 24, through which respective conduits 23 and 24 refrigerant or attempering medium is supplied to and discharged or withdrawn from the passage 20 whereby to circulate refrigerant through the passage 20 to cool the product contained in the product compartment of vat or container 1 by indirect heat exchange between the refrigerant and the product, and under certain circumstances to evacuate or "pump-down" the refrigerant from passage 20.

Agitator or blender 25 extends, from agitator driving motor 26 mounted on vat 1 into the product compartment of vat 1 and is adapted for use in the uniform blending of the product content of vat 1 and for the circulation of the product over the refrigerated heat exchange surfaces, i. e. the surface of passage 20, to facilitate the attempering of the stored product.

Thermal or temperature sensing unit 27 extends into the product compartment of vat 1 for sensing the temperature of the product stored therein. Sensing unit 27 is operatively connected to an electrical switch control unit 28 which is responsive in its operation to the sensing unit 27.

A surge tank or accumulator 29 for refrigerant is vertically arranged adjacent one end of vat 1, and is operatively connected at its upper end to the low pressure refrigerant discharge conduit 24 with the conduit communicating directly with the upper interior portion of accumulator 29. The conduit 23 for supplying high pressure refrigerant to the passage 20, communicates directly with the lower interior portion of accumulator 29, and may be provided interiorly of the tank 29 with a jet type refrigerant recirculating pump (not shown) for recirculating into passage 20, refrigerant which may accumulate in the lower portion of accumulator 29. Low pressure volatized refrigerant discharged or withdrawn from passage 20 is conducted by conduit 24 to a compressor-condenser unit 30, powered by an electric motor 31. From the compressor-condenser unit 30, high pressure refrigerant is supplied to supply conduit 23.

The compressor-condenser unit 30 for circulating the refrigerant or attempering medium through passage 20 may be of the commonly known self-contained type and may be carried on a ledge or bracket secured to vat 1 as illustrated in Figure 1. However, in certain instances, and for certain applications, it may be desired to connect the refrigerant or attempering medium supply and discharge conduits 23 and 24 respectively to a central type or general purpose refrigeration unit, in which latter instance, to avoid interfering with the operation of scale 4, the conduits 23 and 24 may be provided with flexible connection elements 32 and 33 respectively, as shown in Figure 2 for connecting the conduits 23 and 24 to refrigerant supply and discharge pipes.

To permit the manual control of the flow of refrigerant through conduits 23 whereby to permit the "pump-down" or withdrawing of refrigerant by compressor-condenser 30 from passage 20, conduit 23 may be provided with a manually operable valve 34. Similarly, to permit the automatic control of the flow or stoppage of the flow of refrigerant through conduit 23 whereby to permit the "pump-down" or withdrawing of the refrigerant from passage 20 by the compressor-condenser unit 30, conduit 23 as referred to in Figure 1 is provided with a normally open power operated refrigerant supply or flow control or valve 35. Valve 35 is adapted to be actuated automatically between open and closed or flow control positions by electromagnetic actuator or solenoid type prime mover 36. Valve 35 or actuator 36 may be of a construction wherein such conventional arrangements as springs are used to normally hold the valve open and in which the actuator 36 closes the valve against the action of such springs.

A low limit refrigerant suction pressure responsive switch 37 is so installed that the pressure responsive element communicates with the interior of discharge or refrigerant suction conduit 24.

Power is supplied to the motors 26 and 31 and to the valve actuator 36 and connected to pressure switch 37 and to the hereinafter identified switch in control unit 28 through suitable cables connecting these devices to the power source and control circuits in switch box 18.

Referring to the wiring diagram of Figure 4, in explaining one form of the operation of the device of Figure 1, a typical cycle of operation would transpire in the manner now to be described with respect to the storing, cooling, blending, sampling, and weighing of a product such as milk.

The milk to be handled is usually introduced into the product compartment of vat 1 in a relatively warm condition shortly after milking, at which time the electrical power is supplied to the power lines 39 and 40 from a suitable source of power 38, such as a city system, through conventional switch element or circuit breaker or the like having handle 67. Engagement of the warm milk with the thermal sensing unit 27 closes the thermal responsive switch 41 in a first power supply control circuit by action of the control 28, thereby connecting line 39 through switch 41 to terminal 42 of a first clock or timer operated and normally closed switch 43. Terminal 42 is paired with terminal 44 which is connected by line 45 of said first power supply control circuit to one end of the first relay or switch actuator coil 46 for the first power switch 47 of the first electric motor 31 for compressor 30 and to one end of the second relay or switch actuator coil 48 for the second power switch 49 of the second electric motor 26 for agitator 25. The opposite end of the coil of first relay 46 is in turn connected to power source line 40 through a refrigerant suction or low pressure limit switch 37, while the opposite end of the coil of second relay 48 is connected directly to power source line 40 thus completing the first power control circuit for the compressor motor 31 and agitator motor 26. The thus energized electromagnetic first and second switch actuators 46 and 48 operate to respectively close first and second power circuit switches 47 and 49. The circuits of the compressor motor 31 and of the agitator motor 26 each have one end of such circuits connected directly to power source line 40, and the opposite end of such circuit for motor 31 is connected through first power switch 47 to power source line 39, while the opposite end of such circuit for motor 26 is connected through second power switch 49 to power source line 39. It will thus be seen that as soon as the switch 41 is closed in response to the warm temperature of the milk, the first power supply control circuits including the relays 46 and 48 and switch 43 are energized and the power circuits including switches 47 and 49 are closed, thereby commencing the operation of the agitator motor 26 and the compressor motor 31.

The operation of the motor 26 drives the agitator 25 to blend the product in vat 1 and to circulate the product over the heat exchange surfaces containing the refrigerant passage 20. The operation of the motor 31 drives the compressor-condenser unit 30 to circulate refrigerant through the passage 20. As soon as the temperature of the milk in the vat has been suitably reduced, switch 41 is opened in response to the action of the temperature sensing element 27, thereby de-energizing the control relays 46 and 48 to open power switches 47 and 49 whereby to stop motors 31 and 26 respectively, thus stopping the cooling and blending cycle of operation. As soon as the temperature of the milk in vat 1 again rises to an undesirable temperature, the action of the sensing unit 27 again causes the closing of switch 41 and the entire cooling and agitating cycle of operation as hereinbefore described is recommended.

After the product has been suitably cooled and blended, and it is desired to weigh and sample and withdraw the cooled and stored product from the storage vat 1, the manually operable switch 50 is closed to establish a power connection between power source line 39 and the circuit of a clock type, manually resettable switch actuator and sequence timing mechanism 51. The other end of the circuit of the electrical type timing device is connected directly to power line 40. Immediately upon the commencement of the operation of timer 40 at the closing of the switch 50 the actuator linkage 52 of timer 51 opens the first timer actuated switch 43 and closes normally open second timer operated switch 53, thereby de-energizing the first power supply control circuit which includes the line 45 and switch 43, and thus removing the operation of the motors 26 and 31 from the control of the thermal unit 27 and switch 41. Simultaneously with the closing of the second timer operated switch 53 actuator linkage 54 of timer 51 also temporarily closes the third timer operated switch 55 of a second power supply control circuit. One terminal of switch 53 is connected to power source line 39 while the other terminal of switch 53 is connected by line 56 to one terminal of switch 55 and to one end of the coil of valve relay 57 for valve actuator 36. The opposite end of the coil of valve relay 57 is connected directly to power source line 40. The remaining terminal of switch 55 is connected to line 45. When the switches 53 and 55 have thus been closed, power is supplied through switch 53 and line 56 of the second power supply control circuit to energize valve relay 57 and power is supplied through switches 53 and 55 and line 56 to line 45 to re-energize relays 46 and 48 and through their action on switches 47 and 49 recommence the action of motors 31 and 26 by means of the second power supply control circuit. The energization of third relay 57 through the second power supply control circuit closes third power switch 58 one terminal of which is connected to power line 39 and the other terminal of which is connected by line 59 to the one end of the coil of the electromagnetic solenoid type actuator 36 for the refrigerant supply valve 35. The other end of the coil of solenoid type actuator 36 is connected directly to power line 40 to complete a third power supply circuit. The energization of actuator 36 closes valve 35 in keeping with the system of Figure 4.

When the timer 51 has thus been placed in operation, and timer actuator switches 53 and 55 and 58 closed, the agitator 25 and compressor-condenser unit 30 will be operated independent of the control of the temperature sensing unit 27 and valve 35 will be closed, thereby bringing about a period of agitating of the product in the vat 1 and a "pump-down" or withdrawing operation respecting the refrigerant present in the passage 20 and accumulator 29.

Such blending and "pump-down" operation will continue for a desired period of time depending upon the setting of the timer 51, which may be five minutes, until the timer 51 through linkage 54 opens switch 55 while switch 53 remains closed thereby shutting off the power to the power control circuits including relays 46 and 48, which relays, as soon as de-energized, will open power switches 47 and 49 thereby stopping motors 26 and 31, whereby to discontinue the blending and the "pump-down" operation. In the event the "pump-down" operation has been completed prior to the opening of switch 55, and all refrigerant has been withdrawn by such procedure from passage 20 and accumulator 29, and the suction pressure has reached a predetermined low limit, switch 37 will be automatically opened in response to the low refrigerant suction pressure, thereby de-energizing compressor motor relay 46 and in turn opening compressor power switch 47.

Simultaneously with the opening of switch 55, at which time valve 35 remains closed due to the continued energization of relay 57 but motor 26 is stopped and motor 31 is stopped unless it has been previously stopped by the opening of switch 37, timer 51 through linkage 60 closes switch 61 of a fourth power supply control circuit. One terminal of switch 61 is connected to power line 39 while the other terminal of switch 61 is connected by line 62 to one end of the coil of fourth relay 63 the other end of which relay coil 63 is in turn connected to power line 40, thus completing the fourth power supply control circuit and energizing relay 63 to close fourth power switch 64. One terminal of the fourth power switch 64 is connected to power line 39 while the other terminal of switch 64 is connected by line 65 to one end of the coil of electromagnetic solenoid type scale lock actuator 16. The other end of actuator 16 is connected directly to power line 40 to complete the fourth power circuit. Upon the energization of actuator 16 at the closing of switch 64, actuator 16 operates the scale beam lock into unlocked position and retains it in such unlocked position during the period of energization.

After the refrigerant valve 35 has thus been closed, and the refrigerant "pumped-down" in the manner described, and the agitator motor 26 and compressor motor 31 stopped, and the scale lock 13 unlocked, the vat 1 and its stored contents of cooled and blended product may be sampled and weighed, and thereafter the product may be withdrawn from vat 1. After the product has been withdrawn from vat 1 the empty vat is again weighed and the difference between the first and second weights is the net weight of the withdrawn product.

After the product has thus been withdrawn from the vat and the weighing operation completed, and while the refrigerant passage 20 remains in a "pumped-down" condition, the vat may be cleaned with safety.

To ready the device for another use, it is only necessary to open switch 50 to stop the operation of the timer 51, and to press the reset button 66 of timer 51 whereupon linkages 52 and 60 return to their normal positions, reclosing switch 43 and opening switch 53 and opening switch 61. The opening of switch 53 de-energizes relay 57 resulting in the opening of valve 35 through the opening of switch 58 and de-energization of actuator 36.

Similarly the opening of switch 61 de-energizes relay 63 which in turn results in the opening of switch 64, de-energization of scale lock actuator 16 and the automatic relocking of the scale beam 7 by lock 13, whereupon the entire cycle regarding the use of the apparatus may be repeated.

A modified form of operation of the device of Figure 1 for storing, cooling, blending, and weighing a product in a single unit may be obtained by the use of an operating arrangement according to the wiring diagram of Figure 5, when operated with a normally closed refrigerant supply control valve 35, as distinguished from the normally open valve 35 described in connection with the adaptation of the wiring arrangement of Figure 4. According to Figure 5, the warm milk in the vat 1 will cause thermal unit 27 and control 28 to close thermal responsive switch 41 to establish electrical connection between one end of the coil of compressor relay 46 and power source line 39. The other end of the coil of first relay 46 is connected through refrigerant suction low limit pressure switch 37 to power source line 40, thus energizing compressor switch actuator or first relay or solenoid 46 to close compressor first power switch 47. One terminal of first power switch 47 is connected to power line 39 while the other terminal of switch 47 is connected to the one end of the circuit of first compressor motor 31 the other end of which compressor motor circuit is in turn connected to power line 40 to complete the first power circuit. The circuit of agitator or second motor 26 is connected at one end to the power line 40 while the other end of that motor circuit is connected to one terminal of the agitator motor power switch 49. The other terminal of second power switch 49 is connected to power line 39 to complete the second power circuit. Switch 49 is closed upon the energization of second relay 48, one end of the coil of which second relay 48 is connected to power line 40 while the other end of that coil of relay 48 is connected by line 45 through thermal responsive switch 41 to line 39.

The terminal of compressor switch 47 which is connected to compressor 31 is also connected by line 68 to one terminal of the normally closed first clock or timer operated switch 69, the opposite terminal of which is in turn connected by line 70 to one end of the coil of refrigerant supply valve relay 71 the opposite end of which third relay coil is connected directly to power line 40, thus energizing relay 71 whenever switch 47 is closed. Third relay 71 in turn when energized closes third power switch 58 one terminal of which is connected to line 39 and the other terminal of which is connected by line 59 to the coil of electromagnetic solenoid type valve actuator 36, thus energizing actuator 36 to open normally closed refrigerant control valve 35.

As thus connected motors 26 and 31 and valve 35 will operate in the manner described in response to the control of the thermal switch 41, to respectively drive the agitator and cooling device and to open valve 35. When the temperature of the product in vat 1 has been sufficiently reduced, the action of the thermal unit 27 will bring about the opening of switch 41 resulting in the de-energization of control relays 46 and 48 and 71 and the opening of power switches 47 and 49 and 58 and the stoppage of motors 26 and 31 and the closing of valve 35. Upon rewarming of the product in vat 1, switch 41 will again be caused to close in response to thermal unit 27 and the entire cooling and blending cycle of the operation as described with respect to Figure 5 will be repeated upon the recommencement of the operation of motors 26 and 31 and the reopening of valve 35.

When the product in vat 1 has been sufficiently cooled and stored and blended and it is desired to weigh, sample, and withdraw the product, manually operable switch 50 is closed, connecting power line 39 to end of the circuit of the automatic resetting clock type timer and switch actuator 51, the other end of the circuit of which timer 51 is connected directly to line 40, thereby commencing the operation of timer 51. Simultaneously with the commencement of the operation of timer 51 switch actuator linkage 72 of timer 51 closes switch 73, one terminal of which is connected to power line 39 and the other terminal of which is connected to line 45 leading directly to one side of relay 48 as previously described and also leading directly to the side of the coil of relay 46 which is connected to thermal responsive switch 41. Upon the closing of normally open first timer operated switch 73 power is supplied to relays 46 and 48 to energize those two relays and in the manner hereinbefore described to enable the operation of motors 26 and 31.

Simultaneously with the closing of first timer switch 73, linkage 74 of timer 51 opens the normally closed second timer switch 69 thereby breaking the circuit for valve or third relay 71 to prevent the energization of valve actuator 36, thereby causing the valve 35 to remain closed.

During the period that first timer actuated switch 73 remains closed and second timer actuated switch 69 remains open the compressor 30 will "pump-down" the refrigerant from the passage 20 and accumulator 29, and the agitator 25 will operate independent of the thermal switch 41. As soon as the "pump-down" of the refrigerant has progressed to a point when the refrigerant is withdrawn from passage 20 and accumulator 29 and the suction pressure has been reduced to the predetermined lower limit, lower pressure limit switch 37 will open and compressor relay 46 will be de-energized with the resulting stopping of compressor motor 31. The agitator motor 26 will continue to operate as long as switch 73 remains closed. After the lapse of a predetermined period of time, as for example five minutes, timer 51 through linkage 72 will again reopen switch 73.

By that time the low pressure limit switch 37 will be open and in view of the fact that the product in vat 1 is cold, thermal switch 41 will also remain open, with the result that no power will be available through switch 41 to energize the solenoids or actuators 46 and 48 to close the power switches 47 and 49 whereupon motors 26 and 31 will remain idle.

During the entire cooling and agitating operation of the device employing the arrangement of Figure 5, as long as suction pressure switch 37 remains closed, during which time refrigerant may be present in passage 20, the scale or fourth relay 63, one end of the coil of which is connected directly to power line 39 while the other end of the coil of relay 63 is connected through pressure switch 37 to power line 40, remains energized and holds open fourth power supply switch 64 for the scale lock actuator 16. As soon as the relay 63 is de-energized upon the opening of low pressure limit switch 37 at the time of the completion of the refrigerant "pump-down" operation, fourth power supply switch 64 closes, thereby connecting one end of the coil of scale lock actuator 16 to power line 39 while the other end of that coil is connected to power line 40 to complete the fourth power supply circuit, thereby energizing the actuator 16 and unlocking the scale beam lock 13.

At such a time when lock 13 has been unlocked the cooled and stored product may be sampled and the vat 1 and its product content weighed under conditions in which all refrigerant has been emptied from passage 20 and accumulator 29 and all operating motors stopped. After the cooled and stored product has been withdrawn from the vat 1 the empty vat may be reweighed and the difference in the two mentioned weights will be the net weight of the withdrawn product.

After a further lapse of a selected period of time, sufficient to permit the weighing and emptying of vat 1, and cleaning of vat 1, timer 51 through linkage 74 automatically closes switch 69, whereupon relay 71 is again energized to close switch 58 and energize valve actuator 36 to open valve 35. As soon as valve 35 is opened, refrigerant again enters passage 20 closing pressure switch 37 and re-energizing compressor relay 46 whereupon the entire cooling, storing, blending, and weighing, and sampling operation may be recommenced, and relay 63 is re-energized to open power switch 64 whereby to again lock scale lock 13.

In the foregoing description of the invention, reference has been made to the use of a wiring arrangement according to Figures 4 and 5 with the refrigeration and vat arrangement of Figure 1. The arrangement would work in the same manner if applied to a vat and central type refrigeration unit as contemplated by Figure 2 of the drawings.

Figure 3 illustrates the adaptation of the present invention for use in connection with a weighing device such as an electric weighing device wherein the legs of refrigerated vat 1 rest upon a frame 75 supported in turn upon electric units 76 responsive to the weight of vat 1 and its contents. The force responsive electric units 76 are in turn each connected by cables 77 to an indicating unit 78 which is in turn connected by suitable cable to a weight recorder 79. Power is supplied to the electric weighing device through power lines 39 and 40, through switch 80 in line 39. Switch 80 is closed upon the energization of scale lock actuator 16, which actuator 16 is energized in the manner and at a time in accordance with the foregoing description respecting Figures 4 and 5 of the drawings.

The automatic force measuring or weighing device generally indicated in Figure 3 may be of the type disclosed in U. S. A. Patent No. 2,678,206. Obviously, other similar arrangements, such for example as those shown in U. S. A. Patents Nos. 2,545,118, 2,663,247 and 2,668,493 may also be used with certain variations. The weighing device may obviously be of the type utilizing mechanical or electrical or pneumatic principles of operation.

It will be apparent that this invention realizes the introductorily enumerated objectives respecting the improved apparatus for the storing, blending, cooling, sampling, and weighing of a product in a single unit without interference in the weighing operation from circulating refrigerant or operating motors, and which device possesses the hereinbefore listed and indicated advantages, and provides a new, unique and useful apparatus for storing, blending, cooling, and weighing a product.

To those skilled in the pertinent arts it will be apparent that various types of weight or force sensing devices having balance beams or other forms of intelligence conveying arrangements, and being of a mechanical or electrical or pneumatic type may be used to determine the weight of the product. Similarly, it will also be apparent to those skilled in the arts that pneumatic, or mechanical controls may be substituted, at least in part, for the electrical controls illustrated in the drawings, and that in the instance of the use of pneumatic or like controls, suitable valves would be substituted for the described electrical switches. In each such instance, such revised device could also be caused to function in such a manner that, like unto the hereinbefore described improved device, the operation, during the period during which the product is to be weighed and withdrawn from the vat and the empty vat reweighed, the refrigerant previously used to cool the contents of the vat will all have been withdrawn therefrom by the hereinbefore described "pump-down" operation, and all agitator and compressor motors stopped, whereby to enable accurate determination of the weight of the cooled product.

Having thus described and illustrated an embodiment of this invention, the invention is not to be interpreted as being restricted to the specifically illustrated embodiments as set forth in the drawings and as hereinbefore specifically described, except insofar as is necessitated by the disclosure of the prior art and the appended claims.

The invention is claimed as follows:

1. A device for refrigerating and storing and blending and weighing a fluid product, comprising in combination, a scale having a balance beam, a lock for said balance beam, a storage tank supported by said scale, passage means in said storage tank for the circulation of refrigerant to refrigerate the content of said storage tank, an inlet connection and an outlet connection for said passage means, compressor and condenser means for refrigerant, refrigerant supply conduit means connected to said inlet connection for supplying refrigerant to said passage means from said compressor and condenser means, refrigerant discharge conduit means connected to said outlet connection for discharging refrigerant from said passage means to said compressor and condenser means, agitator means extending into said storage tank for agitating the product in said storage tank, first electric motor means for driving said compressor and condenser means, second electric motor means for driving said agitator means, valve means in said refrigerant supply conduit means operable between open and closed positions, electromagnetic valve actuator means, electromagnetic lock actuator means, a first power supply circuit including a first power switch and a power source for energizing said first electric motor means, a second power supply circuit including a second power switch and a power source for energizing said second electric motor means, a third power supply circuit including a third power switch and a power source for energizing said valve actuator means, a fourth power supply circuit including a fourth power switch and a power source for energizing said lock actuator means, and control mechanism including said power source and a timing device adapted at a selected time to simultaneously close said first and second and third power switches whereby to operate said first and second electric motor means and to close said valve means to agitate the product and withdraw refrigerant from said passage means and after a selected period of time to open said first and second power switches and simultaneously close said fourth power switch to stop said first and second electric motor means and to unlock said lock means while maintaining said valve means closed.

2. A device according to claim 1, wherein said control mechanism includes first and second and third and fourth relay means for actuating respectively said first and second and third and fourth switches.

3. A device according to claim 2, wherein said control mechanism has a first power supply control circuit including a first timer operated switch and said first and second relay means, said first timer operated switch being positioned in said first power supply control circuit intermediate said first and second relay means and one side of said power source and being connected to said power source through a thermal responsive switch, said first relay means being connected directly to the other side of said power source, and a pressure sensitive switch connecting said second relay means to the other side of said power source, and a second power supply control circuit having second and third timer operated switches connected in series, said second timer operated switch having its other terminal connected to said power source and said third timer operated switch having its other terminal connected to said first power supply control circuit at a point intermediate said first timer operated switch and said first and second relays, a power supply control line leading from between said second and third timer operated switches to one side of said third relay means the other side of which third relay means is connected directly to the other side of said power source, and a third power supply control circuit including said fourth relay means and a fourth timer operated switch connecting said fourth relay means to one side of said power source while the other side of said power source is connected directly to said fourth relay, said timing device being adapted to simultaneously open said first timer operated switch and close said second and third timer operated switches and after a predetermined period of time to simultaneously open said third timer operated switch and close said fourth timer operated switch.

4. A device for refrigerating and storing and blending and weighing a fluid product, comprising in combination, a scale having a balance beam, a lock for said balance beam, a storage tank supported by said scale, passage means in said storage tank for the circulation of refrigerant to refrigerate the content of said storage tank, an inlet connection and an outlet connection for said passage means, compressor and condenser means for refrigerant, refrigerant supply conduit means connected to said inlet connection for supplying refrigerant to said passage means from said compressor and condenser means, refrigerant discharge conduit means connected to said outlet connection for discharging refrigerant from said passage means to said compressor and condenser means, agitator means extending into said storage tank for agitating the product in said storage tank, first electric motor means for driving said compressor and condenser means, second electric motor means for driving said agitator means, valve means in said refrigerant supply conduit means operable between open and closed positions, electromagnetic valve actuator means, electromagnetic lock actuator means, a first power supply circuit including a first power switch and a power source for energizing said first electric motor means, a second power supply circuit including a second power switch and a power source for energizing said second electric motor means, a third power supply circuit including a third power switch and a power source for energizing said valve actuator means, a fourth power supply circuit including a fourth power switch and a power source for energizing said lock actuator means, and control mechanism including said power source and a timing device and a low pressure responsive switch adapted at a selected time to simultaneously close said first and second power switches and open said third power switch whereby to operated said first and second electric motor means to agitate the product and exhaust refrigerant from said passage means whereby to open said pressure responsive switch when the refrigerant has thus been exhausted and then to close said fourth power switch and unlock said lock, and after a selected period of time to open said first and second power switches, first and second and third and fourth relay means for actuating respectively said first and second and third and fourth switches, said first relay means being connected through a thermal responsive switch to one side of said power source and being connected through a pressure responsive switch to the other side of said power source, said second relay means being connected through said thermal responsive switch to one side of said power source and being connected directly to the other side of said power source, a first timer operated switch having one side connected directly to one side of said power source and having the other side connected to said first and second relay means intermediate said first and second relay means and said thermal responsive switch, a second timer operated switch having one side connected to the first power supply circuit intermediate said first power switch and said first electric motor and having its other side connected to the other side of said power source through said third relay means, said fourth relay means having one side connected directly to said power source and having the opposite side connected to the other side of said power source through said pressure responsive switch, said timing device being adapted at a selected time to simultaneously close said first timer operated switch and open said second timer operated switch and after a predetermined period of time to reopen said first timer operated switch.

5. A device of the type described, comprising in combination, a weight sensitive device having a weight indicator, a lock for said weight indicator, receptacle for material to be attempered and weighed supported by said weight sensitive device, said receptacle being open to the atmosphere, passage means adapted for use in the circulation of attempering medium in indirect heat exchange relation with material contained in said receptacle, the attempering medium circulated in said passage means being separate from the material contained in said receptacle, said passage means having an inlet end and a discharge end, attempering medium supply means and discharge means for circulating attempering medium through said passage means, and attempering medium flow control means for controlling the establishment of operative communication between the inlet end of said passage means and the attempering medium supply means.

6. Apparatus for refrigerating and storing and blending and weighing a fluid product, comprising in combination, a scale, a balance beam for said scale, a lock for said balance beam, a storage tank for product supported upon said scale, passage means in said storage tank for the circulation of refrigerant to refrigerate the product in said storage tank, compressor and condenser unit means for said refrigerant, supply conduit means for supplying refrigerant from said compressor and condenser unit means to said passage means, discharge conduit means for withdrawing refrigerant from said passage means and conducting it to said compressor and condensing unit means, agitator means extending into the product zone of said storage tank, valve means in said supply conduit means, first electric motor means for driving said compressor and condenser unit means, second electric motor means for driving said agitator means, first electric power supply circuit including an electric power source for energizing said first electric motor means, second electric power supply circuit including an electric power source for energizing said second electric motor means, power switch means in said first and said second power supply circuits, electromagnetic actuator means for closing said valve means and for unlocking said lock means, temperature sensing means disposed in said storage tank to sense the temperature of the product content thereof, power supply control circuit means including a temperature responsive switch responsive to said temperature sensing means and also including a reduced pressure sensing means and a reduced pressure responsive switch responsive to the reduced pressure in said discharge conduit and also including relay means for operating said power switch means, whereby to close said power switch means responsive to said temperature sensing means whenever the product in said storage tank reaches a predetermined temperature and to open the first power switch for said first electric motor responsive to said pressure responsive means whenever the pressure in said discharge conduit reaches a predetermined lower pressure, and a timer device and timer actuated switches whereby at a selected time said timer device actuates said timer actuated switches to operate said relays and in turn to operate said electromagnetic actuator means and power switch means to close said valve and operate said first and second electric motor means for a predetermined period of time to withdraw refrigerant from said passage means followed by a discontinuance of the operation of said first and second motor means and the unlocking of said lock.

7. A device according to claim 6, wherein said timing device comprises a clock means.

8. A process for refrigerating and accurately determining the net total weight and accurately sampling a refrigerated liquid mixture consisting of separable ingredients which may be stored in a refrigerating and agitating type vat means which process comprises the steps of, confining the liquid mixture in said refrigerating and agitating type vat means and refrigerating the liquid mixture to a desired temperature by the circulation of a refrigerant in heat exchange relation to said liquid mixture, agitating the confined liquid mixture to secure a uniform blending of the ingredients thereof, withdrawing the refrigerant from said vat means and from heat exchange relation with said liquid mixture and discontinuing the agitation of the confined liquid mixture, weighing the vat means and its contents of refrigerated and blended liquid mixture, sampling the liquid mixture, withdrawing the liquid mixture from the vat means, reweighing said vat means after the liquid mixture has been withdrawn, and subtracting the second mentioned weight from the first mentioned weight to determine the net weight of the refrigerated liquid mixture.

9. In apparatus for weighing refrigerated material content of a weighing tank, weighing means supporting said tank, said weighing means including a weight indicator, refrigerant medium passage means embodied in said weighing tank for refrigerating the material contents of said tank, refrigerant supply means for supplying refrigerant to said refrigerant medium passage means, refrigerant discharge means for discharging refrigerant from said refrigerant medium passage means, valve means for stopping the flow of refrigerant medium through said refrigerant supply means, means for withdrawing refrigerant from said refrigerant medium passage means through said refrigerant discharge means when said valve means is closed, lock means for locking said weight indicator in inoperable position, and control means including a timing device and actuator means for actuating said valve means and said lock means and being operable to close said valve means a predetermined period prior to unlocking said lock means, whereby any refrigerating medium in said refrigerant medium passage means is withdrawn from said refrigerant medium passage means prior to the unlocking of said lock means.

10. A device for storing and attempering and weighing a product to be withdrawn from a storage container, comprising in combination, a weight responsive container support having a weight indicating portion, a container for product to be stored and attempered supported by said container support and including attempering medium passage means for the circulation of attempering medium for attempering the product stored in said container, supply connection means and discharge connection means for the supply and discharge respectively of attempering medium to and from said attempering medium passage means, valve means for controlling the flow of attempering medium through said supply connection means, and normally locked lock means for locking the indicating portion of said weight responsive container support, whereby upon the closing of said valve means and the evacuation of attempering medium from said attempering medium passage means and the unlocking of said lock means when the attempering medium has been evacuated from said passage means the net weight of the attempered product stored in said container and to be withdrawn therefrom may be accurately determined devoid of error resulting from the escape of attempering medium from said passage means by weighing said container and any content of attempered product before and after the withdrawal of the attempered product from said container and subtracting the second weight from the first weight.

11. A device according to claim 10, having electromagnetic means for sequentially closing said valve means when energized and unlocking said lock means when energized, a source of electric power, and switch means for connecting said source of electrical power to said electromagnetic means.

12. A device according to claim 11, having clock means for sequentially operating said switch means in predetermined timed order for connecting said source of electrical power to said electromagnetic means.

13. A device according to claim 10, having power responsive means for sequentially closing said valve means and unlocking said lock means, a source of power, and control means for sequentially supplying power to said power responsive means.

14. Apparatus for attempering and determining the weight of attempered product, comprising in combination, a weighing device including a balance mechanism, lock means for locking said balance mechanism in inoperable position, receptable means supported by said weighing device for receiving product to be attempered and weighed, said receptacle means having attempering medium passage means for the circulation therethrough of attempering medium in heat exchange relation with product in said receptacle means, attempering medium supply and discharge means operatively connected by supply conduit means and discharge conduit means to the opposite ends of said attempering medium passage means for the circulation of attempering medium through said passage means and for withdrawing attempering medium from said passage means, valve means operable between open and closed positions in said supply conduit means, valve operating means for said valve means for operating said valve means between open and closed positions, and lock operating means for said lock means for unlocking said lock means, said valve operating means and said attempering medium supply and discharge means and said lock operating means being operable in sequence so that said valve operating means closes said valve followed by the discharge of attempering medium from said attempering medium passage means by said attempering medium supply and discharge means followed by the unlocking of said lock means by said lock operating means, whereby to enable the weighing of the attempered product content of said receptacle means devoid of possible interference from continued circulation or escape of attempering medium.

15. Apparatus for attempering and weighing an attempered product in a single unit, comprising in combination, a load sensitive means, load intelligence conveying device responsive to said load sensitive means to indicate the load sensed by said load sensitive device, a product receptacle supported at least in part by said load sensitive device, said product receptacle including heat exchange means for the exchange of heat between the product in said receptacle and attempering medium in said heat exchange means, conduit means for circulating attempering medium through said heat exchange means, closeable valve means in said conduit means for preventing the entrance of attempering medium into said heat exchange means upon the closing of said valve means, valve actuating means for actuating said valve means from open position to closed position, restraining means for said intelligence conveying device, restrainer actuator means for said restraining device operable to release said restraining device, attempering medium withdrawing means operably connected to said conduit means and adapted to withdraw attempering medium from said heat exchange means, and control means for sequentially causing said valve actuating means to close said valve followed by the withdrawal of attempering medium from said heat exchange means by said attempering medium withdrawing means followed by the release of said restraining device by said restrainer actuator means.

16. In combination, weight determining means adapted to support and weigh a storage chamber means and the content thereof, storage chamber means supported by said weight determining means, attempering medium passage means adapted to establish heat exchange relation between attempering medium flowing through said attempering medium passage means and the contents of said storage chamber, supply conduit means for supplying attempering medium to said attempering medium passage means, discharge conduit means for discharging attempering medium from said attempering medium passage means, attempering medium circulating means adapted to cause the circulation of attempering medium through said supply conduit means and through said attempering medium passage means and to withdraw attempering medium from said attempering medium passage means through said discharge conduit means, valve means in said supply conduit means, weight indicating means comprising part of said weight determining means, restraining means adapted to restrain the operation of said weight indicating means, and prime mover means for sequentially operating said valve means to close said valve means followed by the operation of said attempering medium circulating means to withdraw the attempering medium from said attempering medium passage means followed by the operation of said restraining means to discontinue the restraint upon said weight indicating means.

17. A method for refrigerating and accurately determining the weight of confined refrigerated material, comprising the steps of, confining the material under atmospheric pressure in a confining means open to the atmosphere and refrigerating the thus confined material to a desired temperature by indirect heat exchange with a circulating refrigerant separate from the thus confined material, withdrawing the refrigerant from indirect heat exchange relation with the thus confined refrigerated material while the refrigerated material remains confined in the confining means, and then determining the weight of the refrigerated material while the material remains thus confined in the confining means.

18. Apparatus for attempering material and determining the net weight of the attempered material, comprising in combination, confining means open to the atmosphere for material to be attempered and weighed, attempering means through which attempering medium which is separate from the material to be attempered may be circulated in indirect heat exchange relation to said material while confined, withdrawal means for withdrawing the attempering medium from said attempering means, weight determining means for determining first the combined weight of the attempered material and the confining means and for subsequently determining the weight of the confining means after the attempered material and the attempering medium have been removed from said confining means.

19. Apparatus for storing and attempering and weighing material, comprising in combination, a weighing device having a weight indicator, a lock for said weight indicator, a storage receptacle supported by said weighing device and including passage means for the circulation of attempering medium in heat exchange relation with material stored in said storage receptacle, circulating means for circulating attempering medium through said passage means and for withdrawing attempering medium from said passage means, driving means for operating said circulating means, lock actuator means for said lock for unlocking said lock, valve means for preventing attempering medium from flowing from said circulating means into said passage means, valve actuator means for closing said valve means, and control means for sequentially operating said valve actuator to close said valve means and operating said driving means to cause said circulating means to withdraw attempering medium from said passage means followed by the operation of said lock actuator means for unlocking said lock means.

20. Apparatus according to claim 19, wherein said driving means is an electrical motor and wherein said lock actuator means and said valve actuator means are electromagnetic devices and wherein said control means includes a timing device and electric switches actuated in predetermined sequence by said timing device.

21. A method for attempering and accurately determining the weight of attempered material, comprising the steps of, attempering the material to a desired temperature through indirect heat exchange with attempering medium while the material is confined in a confining means and while the confined material is so supported upon weight sensitive means as to enable the determination of the weight of the thus confined material, withdrawing the attempering medium from heat exchange relation with the thus confined and attempered material, and then determining the weight of the attempered material while the material remains thus confined.

22. A method for refrigerating and accurately determining the weight of refrigerated material, comprising the steps of, refrigerating the material to a desired temperature through indirect heat exchange with refrigerating medium while the material is confined in a confining means and while the confined material is so supported upon weight sensitive means as to enable the determination of the weight of the thus confined material, withdrawing the refrigerating medium from heat exchange relation with the thus confined and refrigerated material, and then determining the weight of the refrigerated material while the material remains thus confined.

23. A method for attempering and accurately determining the weight of attempered material, comprising the steps of, attempering the material to a desired temperature through indirect heat exchange with attempering medium while the material is confined in a confining means open to the atmosphere and while the confined material is so supported upon weight sensitive means as to enable the determination of the weight of the thus confined material, withdrawing the attempering medium from heat exchange relation with the thus confined and attempered material, and then determining the weight of the attempered material while the material remains thus confined.

24. Apparatus for attempering material and determining the weight of the attempered material, comprising in combination, confining means for confining material to be attempered and weighed, attempering medium circulating means for circulating attempering medium in indirect heat exchange relation with the confined material to be attempered in said confining means, said circulating means being devoid of direct communication with the material to be attempered, withdrawal means for withdrawing the attempering medium from heat exchange relation with the attempered material, weight sensitive means so constructed and arranged and so supporting at least in part said confining means and the material confined therein as to enable determination of the weight of the confined material.

25. Apparatus for refrigerating material and determining the net weight of the refrigerated material, comprising in combination, confining means for confining material to be refrigerated and weighed, passage means through which refrigerant medium may be circulated in indirect heat exchange relation with the confined material to be refrigerated in said confining means, said passage means being devoid of communication with the material to be refrigerated, withdrawal means for withdrawing the refrigerating medium from said passage means, weight sensitive means so constructed and arranged as to support said confining means and the material confined therein in such a manner as to enable determining the weight of the refrigerated material confined in said confining means.

26. Apparatus for attempering material and determining the weight of the attempered material, comprising in combination, confining means open to the atmosphere for atmospherically confining material to be attempered and weighed, attempering medium circulating means for circulating attempering medium in indirect heat exchange relation with the confined material to be attempered in said confining means, said circulating means being devoid of direct communication with the material to be attempered, withdrawal means for withdrawing the attempering medium from heat exchange relation with the attempered material, weight sensitive means so constructed and arranged and so supporting at least in part said confining means and the material confined therein as to enable determination of the weight of the confined material.

27. A device of the type described, comprising in combination, a weight sensitive device, an atmospheric type receptacle for confining material to be attempered and weighed, said receptable being supported at least in part by said weight sensitive device so as to enable the determination of the weight of the material confined in said receptacle, attempering means adapted for use in the indirect heat exchange between attempering medium and the material to be attempered while the material is confined in said receptacle, attempering medium supply and discharge means for supplying attempering medium to and for discharging attempering medium from said attempering means while the material is confined in said receptacle, and attempering medium control means for controlling the supply of attempering medium to said attempering means and for permitting withdrawal of attempering medium from heat exchange relation with the material confined in said receptacle.

28. A device of the type described in claim 27, wherein said attempering means is a refrigerating means adapted for use in the indirect refrigeration of material confined in said receptacle.

29. A process for cooling and accurately determining the weight of and sampling cooled liquid mixture, consisting of separable ingredients, comprising the steps of, confining the liquid mixture in a cooling and agitating type receptacle and cooling the liquid mixture to a desired temperature by indirect heat exchange with a cooling medium separate from the liquid mixture while the liquid mixture is thus confined, agitating the confined and cooled liquid mixture to secure a uniform blending of the ingredients thereof, continuing the agitation of the confined and cooled liquid mixture and withdrawing the cooling medium from heat exchange relation with the confined cooled liquid mixture while the liquid mixture remains thus confined and while the agitation of the liquid mixture continues, discontinuing the agitation of the cooled and confined liquid mixture, weighing said receptacle and its contents of confined and cooled and blended liquid mixture, sampling the cooled and blended liquid mixture, withdrawing the cooled liquid mixture from said receptacle, and determining the weight of the withdrawn cooled and blended liquid mixture.

30. A device of the type described, comprising in combination, a weight sensitive means, weight intelligence conveying means responsive to said weight sensitive means to indicate the weight sensed by said weight sensitive means, an atmospheric type receptacle supported at least in part upon said weight sensitive means so as to enable said weight sensitive means to sense the weight of said receptacle and the contents thereof, refrigerant medium passage means for passing refrigerant medium in indirect heat exchange relation with a product to be refrigerated while the product is confined in said receptacle, refrigerant supply means for supplying refrigerant to said passage means, refrigerant discharge means for discharging refrigerant from said passage means, flow control means for controlling the flow of refrigerant through said supply means, withdrawing means for withdrawing refrigerant from said passage means through said discharge means when said control means stops the flow of refrigerant through said supply means, inactivator means for said intelligence conveying means, and sequence control means for actuating said flow control means and said inactivator means and being operable to actuate said flow control means to stop the flow of refrigerant through said supply means a predetermined period of time prior to releasing said inactivator of said intelligence conveying means, whereby any refrigerant in said passage means is withdrawn from said passage means prior to the operation of said intelligence conveying means.

31. A device for storing and attempering and weighing a product in a storage container, comprising in combination, a weight sensing container support having a weight indicator, a container for a product to be stored and attempered, said container being supported in weight sensing arrangement upon said container support, passage means for attempering medium for placing attempering medium separate from the product within said container in indirect heat exchange relation with product stored in said container, supply means for supplying attempering medium to said passage means while the product is stored in said container, withdrawing means for withdrawing attempering medium from said passage means while the product remains stored in said container, supply control means for controlling the supplying of attempering medium into said passage means through said supply means, and weight indicator restraining means for normally rendering inoperable said weight indicator, said device being so constructed and arranged that upon the closing actuation of said supply control means to stop the supplying of attempering medium through said supply means to said passage means and upon the withdrawing of the attempering medium from said passage means followed by inactivation of said weight indicator restraining means and the restoration of the operability of said weight indicator the weight of the attempered product stored in said container may be determined from said indicator by then weighing the container and the product stored therein and then discharging the product from the container and then weighing the empty container and then deducting the weight of the empty container from the combined weight of the container and the stored material.

References Cited in the file of this patent

UNITED STATES PATENTS

| | | |
|---|---|---|
| 2,018,857 | Kniskern | Oct. 29, 1935 |
| 2,075,408 | Sholes | Mar. 30, 1937 |
| 2,440,397 | Erickson | Apr. 27, 1948 |